Dec. 30, 1941.  A. F. BUSICK, JR., ET AL  2,268,017
LEVELING DEVICE
Filed Oct. 19, 1940  5 Sheets-Sheet 1

Fig.1

INVENTORS
ADRIEN F. BUSICK JR.
WILLIAM E. GILDERSLEEVE
BY
ATTORNEY

Dec. 30, 1941.    A. F. BUSICK, JR., ET AL    2,268,017
LEVELING DEVICE
Filed Oct. 19, 1940    5 Sheets-Sheet 4

INVENTORS
ADRIEN F. BUSICK JR.
WILLIAM E. GILDERSLEEVE
By
ATTORNEY

Dec. 30, 1941.          A. F. BUSICK, JR., ET AL          2,268,017
                         LEVELING DEVICE
                    Filed Oct. 19, 1940          5 Sheets-Sheet 5

Fig.8

INVENTORS
ADRIEN F. BUSICK JR.
WILLIAM E. GILDERSLEEVE
By
ATTORNEY

Patented Dec. 30, 1941

2,268,017

UNITED STATES PATENT OFFICE

2,268,017

LEVELING DEVICE

Adrien F. Busick, Jr., and William E. Gildersleeve, Marion, Ohio, assignors to The Marion Steam Shovel Company, Marion, Ohio, a corporation of Ohio Application October 19, 1940, Serial No. 361,982

23 Claims. (Cl. 280—6)

This invention relates to a leveling apparatus and more particularly to an apparatus for maintaining a movable structure, such as a platform, substantially horizontal or level.

One object of the invention is to provide means controlled by the tilting of the structure from a horizontal position to automatically restore the same to horizontal position.

A further object of the invention is to provide a leveling apparatus for a normally horizontal structure, such as the platform of an excavating machine, in which the operation of the level restoring elements will be controlled by a tilt responsive device of simple construction and high sensitivity and of such a character that it is not liable to be disarranged or rendered inoperative in the normal use of the structure with which it is connected.

A further object of the invention is to provide such a leveling apparatus in which the operation of the level restoring elements will be controlled by a light controlled device which in turn is controlled by a level responsive device.

A further object of the invention is to provide a tilt controlled mechanism which is highly sensitive and the sensitivity of which may be easily varied in accordance with the requirements.

A further object of the invention is to provide a tilt controlled mechanism which may be assembled in a small compact unit and which may be installed or removed from the structure as a unit, and may be adjusted as a unit with relation to the structure on which it is mounted.

A further object of the invention is to provide such a leveling apparatus having hydraulic level restoring elements, simple efficient means for controlling the operation of said hydraulic elements and tilt controlled means for selectively operating said controlling means.

Other objects of the invention may appear as the apparatus is described in detail.

In the accompanying drawings

In these drawings we have illustrated one embodiment of our invention and have shown the same as applied to an excavating machine. It will be understood, however, that the invention may take various forms and that it may be applied to structures of various kinds.

Figure 2:
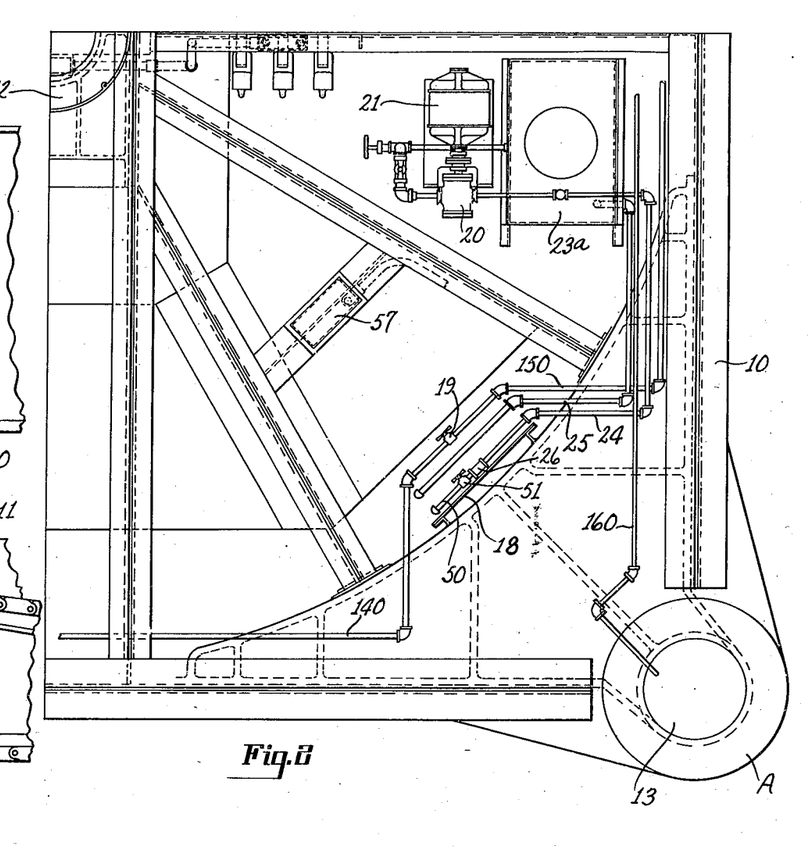
Fig. 2 is a plan view of a portion of the base structure of an excavator showing the arrangement of the level controlling apparatus thereon.
Figure 3:
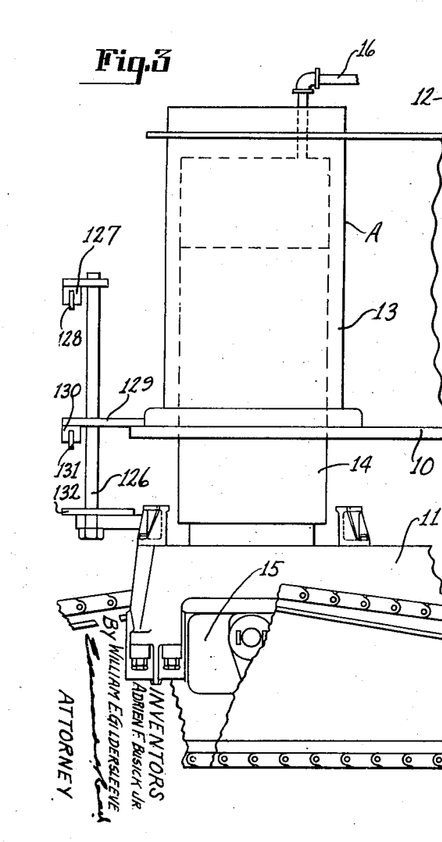
Fig. 3 is an elevation of one of the hydraulic jacks.

An excavating machine of the type in connection with which the invention is here illustrated comprises a rectangular base structure 10 supported at each of its four corners by a separate traction device 11. A revolving platform, which carries the excavating mechanism and power plant, is mounted on the base structure for rotation about a vertical axis adjacent the center of the base, as indicated by the bearing 12 in Fig. 2. This platform is maintained substantially parallel with the base structure so as to be maintained in a level position when the base structure is in a level position. The four corners of the base structure are connected with and supported on the respective traction devices by jacks, which may be extended or contracted to vary the position of the structure with relation to the jacks and to thereby restore the base structure to a horizontal or level position when it has been tilted from that position. The level supporting elements are preferably in the form of hydraulic jacks, each of which comprises a cylinder 13 rigidly mounted on the base structure, as shown in Figs. 2 and 3, and a piston operating in the cylinder and connected with the frame of the traction device. Preferably the piston is connected with the traction device by a universal joint 15 to permit the traction device to tilt with relation to the jack.

When one corner of the base structure is moved downwardly with relation to the other corners the structure will tilt about an axis coincident with or substantially parallel with a line extending between diagonally opposite corners of the structure which are spaced from the lowered corner of the structure. When the structure has been so tilted it is restored to its normal level position by introducing into the jack at the lower corner of the structure liquid, such as oil, under pressure, so as to force the cylinder and the corner of the structure upwardly, and at the same time withdrawing from the jack at that corner which is diagonally opposite the lower corner, liquid in quantities substantially equal to the quantity of liquid which is introduced into the lowered jack. Thus in restoring level the jacks operate in pairs, diagonally opposite jacks A and B operating to restore level when the structure is tilted about a diagonal axis extending between the jacks C and D, and jacks C and D operating to restore level when the structure is tilted about a diagonal axis between jacks A and B. Therefore separate means have been provided for controlling the operation of the two pairs of jacks A—B and C—D.

Figure 4:
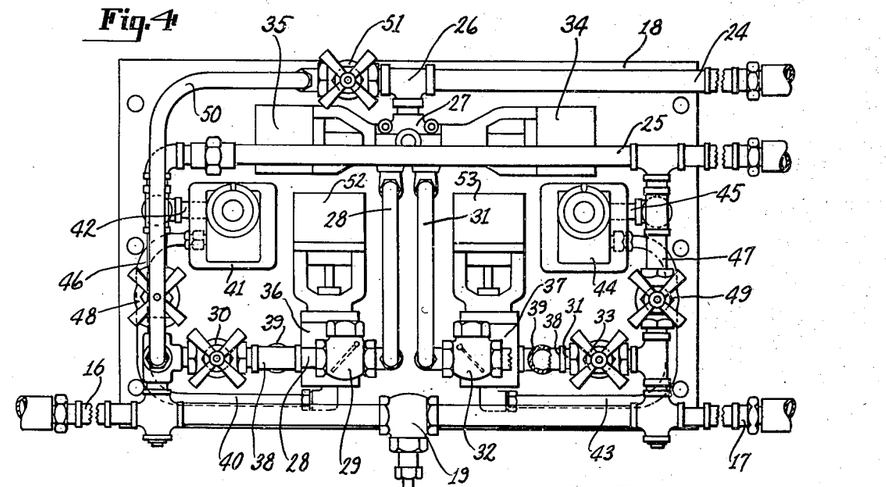
Fig. 4 is an elevation of one of the valve panels.
Figure 5:
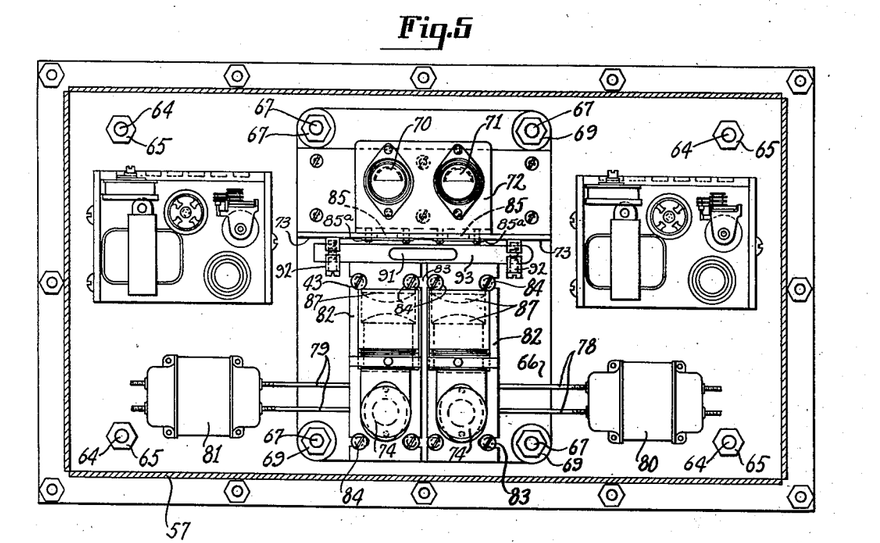
Fig. 5 is a plan view of one of the controlling units with the casing in section.

The controlling mechanisms for the two pairs of jacks are identical in construction and operation and a description of the controlling mechanism for jacks A and B will apply equally well to the controlling mechanism for the jacks C and D. Both jacks are connected with a source of supply of liquid under pressure by a piping system having means for selectively controlling the connections to cause liquid under pressure to be delivered to either jack which may be low and liquid to be withdrawn from the other or high jack. In the present arrangement a pipe 16 is connected with the cylinder of jack A and a pipe 17 is connected with the cylinder of jack B. These pipes preferably extend to a valve panel 18. In the present construction the pipes 16 and 17 are shown as connected one with the other by a normally closed hand valve 19. A pump 20, driven by an electric motor 21, has its inlet connected by a pipe 22 with a liquid storage reservoir 23 and has its outlet connected with a pressure pipe 24 which also leads to the valve panel 18. A return pipe 25 extends from the valve panel to the reservoir 23. In the schematic view of Fig. 1 a single reservoir is shown as connected with the piping systems for both pairs of jacks but in large installations it is preferable to provide a separate storage resorvoir for each pipe system, the two reservoirs being connected one with the other, and in Fig. 2 there is shown a reservoir 23a which is connected with one pipe system only. The valve panel is shown in detail in Fig. 4 and as there shown the pressure pipe 24 is connected by a T-fitting 26 with a two way valve 27. One outlet of the valve 27 is connected with a pipe 28 which in turn is connected with the pipe 16 leading to the jack A. Inserted in the pipe 28 is a forwardly opening check valve 29 and a normally open hand valve 30. The other outlet of the two way valve 27 is connected by a pipe 31 with the pipe 17 leading to the jack B. The pipe 31 also is provided with a forwardly opening check valve 32 and a normally open hand valve 33. The two way valve 27 is preferably electrically operated and, as here shown, is controlled by two solenoids 34 and 35. The pipe 28 which leads to the jack A is also connected with a valve 36, and the pipe 31 which leads to the jack B is connected with a valve 37. In the arrangement shown each pipe, 28 and 31, is provided beyond its check valve with a T-fitting 38 from which a branch pipe 39 extends to the valve, 36 or 37. The other side of the valve 36 is connected with the return pipe 25 and, in the present instance, a pipe 40 extends from the valve 36 to a metering valve 41 which is connected by a pipe 42 with the return pipe 25. The valve 37 is likewise connected with the return pipe 25 by a pipe 43, metering valve 44 and pipe 45. The pipes 28 and 31 are respectively directly connected with the return pipe 25 by pipes 46 and 47 in which are normally closed hand valves 48 and 49. A pipe 50 leads from the T-fitting 26 of the pressure pipe 24 to the pipe 16 and is controlled by a normally closed hand valve 51. The valves 36 and 37 are, in the present instance, respectively actuated by solenoids 52 and 53. When the jack A is low the solenoid 34 is energized to move the two way valve 27 to a position to connect the pipe 28 and therefore the pipe 16 with the pressure pipe. At the same time the solenoid 53 is energized to open the valve 37 and thus connect the pipe 17 with the return pipe 25, the check valve 32 being closed by the pressure of the liquid in the pipe 17. The motor 21 is then energized to operate the pump and force liquid into the jack A, and liquid is forced out of the jack B by the weight of the load thereon and flows through the pipe 17, valve 37 and return pipe 25 to the storage reservoir 23. When level has been restored both solenoids are deenergized. When the jack B is low the solenoid 35 is operated to connect the pipe 17 of jack B with the pressure pipe and the solenoid 52 is operated to connect the pipe 16 and jack A with the return pipe. By a proper manipulation of the several hand valves the valve mechanism may be manually controlled to cause the jacks to be extended or contracted as may be desired to effect the desired level of the base structure, and this also permits of the removal of the electric valves for inspection or repair without shutting down the machine. The pipe systems for the two pairs of jacks are connected by pipes 54 and 55 with an electrically operated equalizing device 56. In a leveling system of this character it is important that the quantity of liquid which is being delivered to the reservoir from the high jack, which is being lowered, shall be substantially equal to the quantity of liquid which is being pumped from the reservoir to the low jack, which is being raised, and for this purpose means are provided for automatically regulating the flow of liquid from the high jack to the reservoir. In the present installation this regulating means comprises the metering valves 41 and 42, of a known type, which are interposed between the respective control valves and the return pipe.

Figure 1:
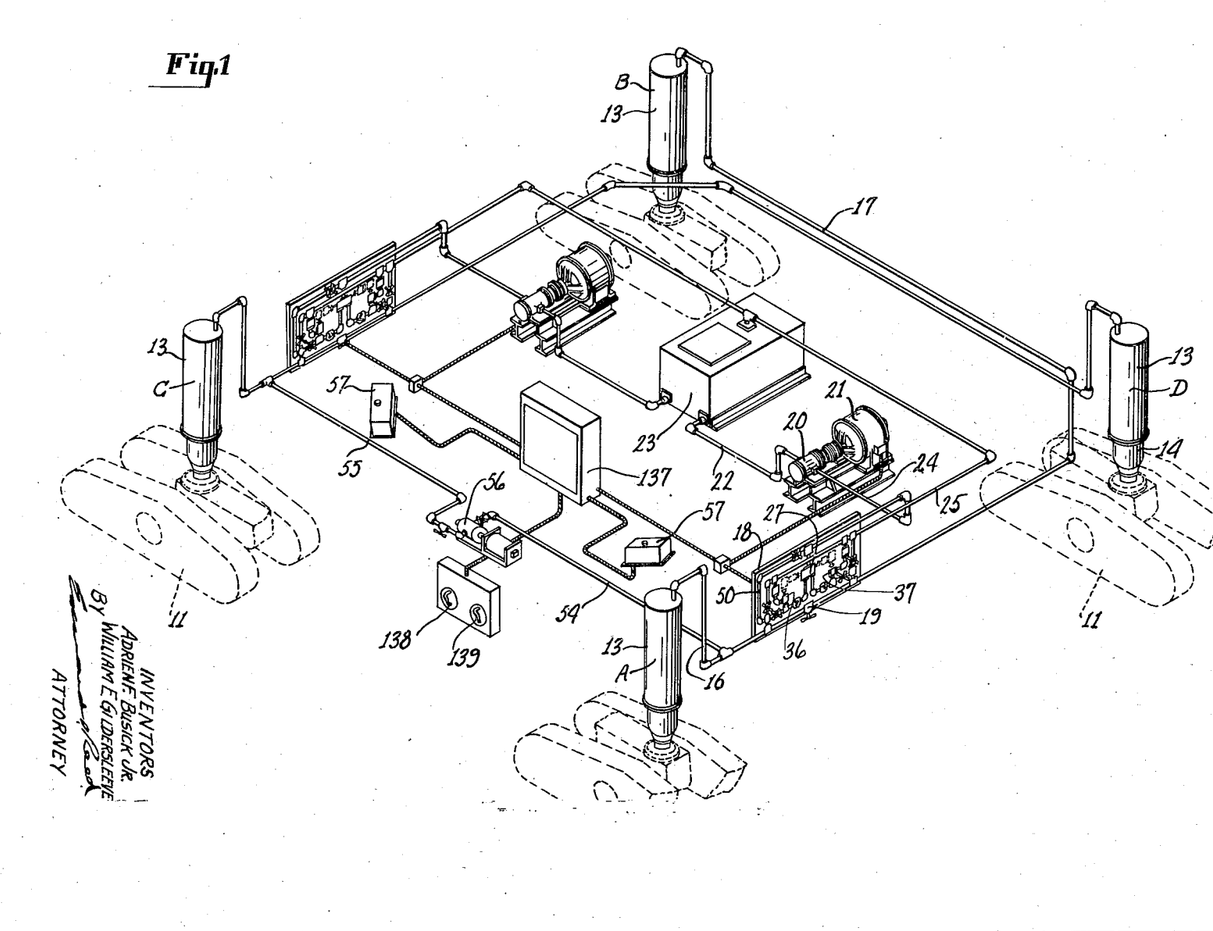
Fig. 1 is a schematic view of a level controlling apparatus embodying our invention, omitting the structure to be controlled.

The arrangement of the valve panels and piping which is shown diagrammatically in Fig. 1 has been chosen to facilitate the illustration and is operative, but in practice it is preferable to so arrange the valve panels that the pipes connecting each valve panel with the jacks controlled thereby will be of substantially the same length. For that purpose the valve panel 18 which controls jacks C and D is located adjacent jack A, as shown in Fig. 2, and the valve panel which controls jacks A and B is located adjacent jack D. Referring to Fig. 2 it will be noted that the valve panel 18 is connected by pipes 24 and 25, respectively, with the pump 20 and reservoir 23a. The pipe 140, which corresponds to pipe 16 of Fig. 1, leads from the valve panel to jack C, and pipe 150, which corresponds to pipe 17 of Fig. 1, leads from the valve panel to jack D. The jack A is connected by pipe 160 with the second valve panel, which is located adjacent jack D, but is not shown in Fig. 2.

Figure 6:
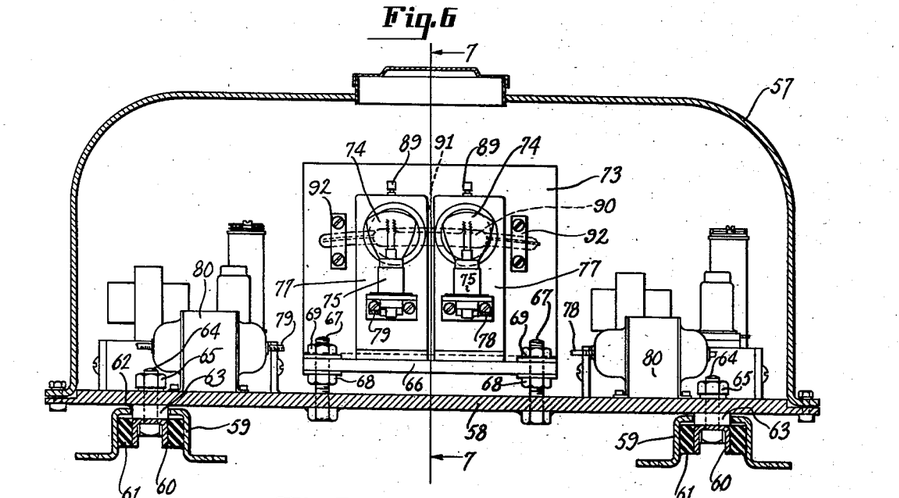
Fig. 6 is a front elevation of a controlling unit with the casing in vertical section.
Figure 7:
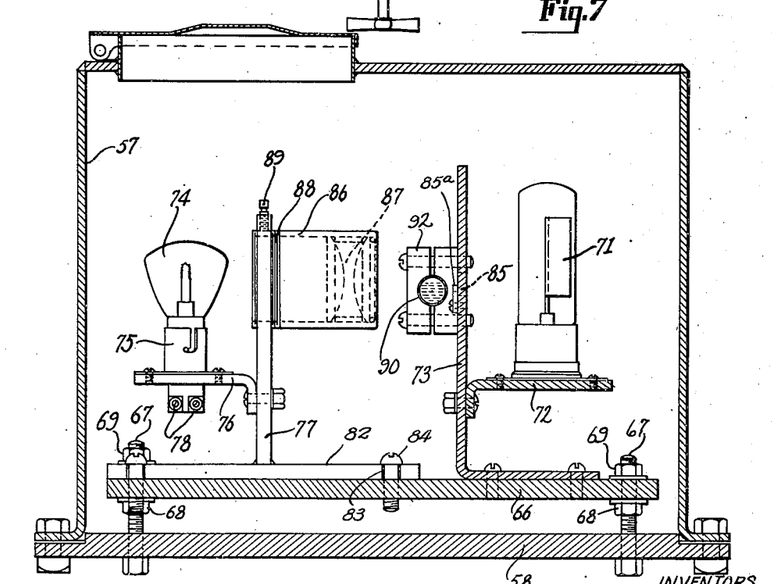
Fig. 7 is a vertical section taken on the line 7—7 of Fig. 6.

The valves which are to be operated to restore the structure to a level position are automatically selected and actuated in accordance with the direction in which the structure is tilted. The mechanism for effecting this automatic control is preferably assembled as a unit and, in the present instance, is enclosed in a casing 57 which is mounted on the base structure in suitable relation to one of the jacks which is to be controlled thereby. It will be understood of course that there is a separate control unit for the second pair of jacks and that this unit is arranged in suitable relation to one of the jacks of the last mentioned pair, as shown in Fig. 1. In the present construction the bottom plate 58 of the casing 57 constitutes a base on which the several elements of the unit are supported. This base, and therefore the casing 57, may be mounted on the base structure in any suitable manner but preferably the connection is a cushioned one to absorb jars and vibrations incident to the operation of the excavator. As shown more particularly in Fig. 6 the connecting means comprises a channel member 59 which may be rigidly secured to the base structure as by bolts or screws. Mounted within the member 59 is a second channel member 60 of a width substantially less than the width of the member 59, and yieldable material, such as soft rubber 61, is interposed between and firmly secured to the two members to form a cushioned element. The member 59 is provided in its upper transverse portion with an opening 62 in which is mounted a spacing member or washer 63, of a diameter slightly less than the diameter of the opening 62 to permit the spacing member to have movement in that opening. A bolt 64 extends through the inner member 60, through the spacing member 63 and the base 58 so that by tightening a nut 65 on the bolt the spacing member may be firmly clamped between the top of the inner member 60 and the base, and the base thus firmly but yieldably connected with the main base structure.

Mounted on the base 58 of the housing 57, within the latter, is a sub-base 66 which is preferably adjustable with relation to the base 58 so that it can be accurately leveled independently of the base. To this end the sub-base is here shown as mounted on screw threaded studs or bolts 67 which extend through and are rigidly secured to the base, as by welding, and each of which is provided with nuts 68 and 69 arranged respectively above and below the sub-base. By properly adjusting these nuts on the several bolts or studs the sub-base may be brought to an accurate level and then firmly secured in that position.

The means for selectively controlling the operation of the several valves may take various forms but it preferably comprises light controlled means and a tilt responsive device to control the projection of light onto the light controlled means. In the present instance, we have utilized two light controlled devices, such as photoelectric cells 70 and 71, which are here shown as mounted on a bracket 72 carried by and extending rearwardly from an upright member or plate 73 which is rigidly mounted on the sub-base 66. These light controlled devices are of well known construction and each of them is provided with the usual amplifier and relay to control the actuating devices for the valves and also to control the operation of the pump, as will be hereinafter described. Light may be projected onto the respective light controlled devices from any suitable source and, in the present instance, a separate low voltage incandescent lamp 74 is provided for each light controlled device. As shown these lamps are mounted in sockets 75 carried respectively by brackets 76 secured to upright members or standards 77, the two sockets being here shown as connected by conductors 78 and 79 with separate transformers 80 and 81 adapted to be connected across the current supply line. The standards 77 are mounted for adjustment laterally with relation one to the other and for that purpose they are mounted on plates 82 having transverse slots 83 through which extend screws 84 which are threaded into the sub-base 66. The upright plate 73, which is arranged between the light controlled devices and the light sources, is provided with small openings 85 through which the light from the lamps may pass to the respective light controlled devices. It is preferable to concentrate the light from the light source so that it will be projected onto the light controlled device in the form of a small beam. For this purpose we have provided light concentrating devices which are here shown in the form of cylinders 86 mounted on the respective standards 77 in line with the lamps 74 and are provided with lenses 87 to concentrate the light beams on the openings 85 and on the light controlled devices. The concentrating devices may be made adjustable to vary the character of the beam, as by screw threading the same into openings in the standards 77, as shown at 88, and securing them in adjusted positions by set screws 89.

The projection of the light onto the light controlled devices is controlled by a tilt responsive device, that is, a device which is operable by the tilting movement of the structure to be controlled. This tilt responsive device may take various forms and may control the projection of the light in various ways. In the present arrangement it is so arranged with relation to the light sources and the light controlled devices that when in its normal or level position it will prevent the projection of light onto either light controlled device, but when moved in one direction from its normal position it will cause light to be projected on one of said light controlled devices and when moved in the other direction from its normal position will cause light to be projected onto the other of said light controlled devices. In the present instance, the level responsive device is in the nature of a spirit level and comprises a transparent tube 90 containing liquid in such quantity as to form therein an elongate bubble 91. The tube is supported near its ends on the upright member 73 by means of clamping blocks 92 and is thus connected with the main base structure in such a manner that it will tilt therewith. The tube is mounted with its uppermost portion just above the level of the apertures 85 in the plate 73 and the bubble is of such length that when the device is in its normal or level position the bubble will lie between and be spaced slightly from the paths of the beams of light, thus causing the beams to impinge upon the liquid in the tube and to be thereby prevented from reaching the light responsive devices, either by refraction or otherwise. When the tube is tilted slightly from its normal position the bubble will move across the path of one or the other of the beams of light and in line with the corresponding aperture 85, thereby permitting the beam of light to pass through the bubble and aperture 85 to the light controlled device, and to energize the latter. When the tube returns to its level position the bubble will be again moved out of line with both beams and the liquid will prevent the light from reaching the light controlled devices. In practice we prefer to make each aperture 85 somewhat larger than the beam of light and to close the lower portion of the aperture by a small plate 85a adjustably mounted on the upright plate 73. This plate 85a is so positioned that when the tube 90 is in its level position, and the beam of light is deflected downwardly by the liquid, the beam will strike the plate 85a and will not pass to the light controlled device. When the tube is tilted so that the beam of light passes through the bubble the beam will pass above the plate 85a to the light controlled device. The tube may be of various shapes and sizes but preferably it is provided with a slight upward curve, in the present instance on a radius of approximately six feet. It is desirable that the tubular portion of the device should be of such a length as to preserve the bubble in proper form and to prevent the same from passing beyond the aperture with which it is in line. In the arrangement shown, the device as a whole is tubular for only a portion of its length and is provided at its ends with substantially solid portions 93 of smaller diameter than the tubular portion and provided with very fine longitudinal channels 94. When the tube is first constructed these channels 94 are open at both ends of the tube and are utilized in filling the tube, the air being exhausted from the tube through one channel and the liquid drawn into the tube through the other channel. After the tube has been filled the ends thereof are sealed.

Figure 8:
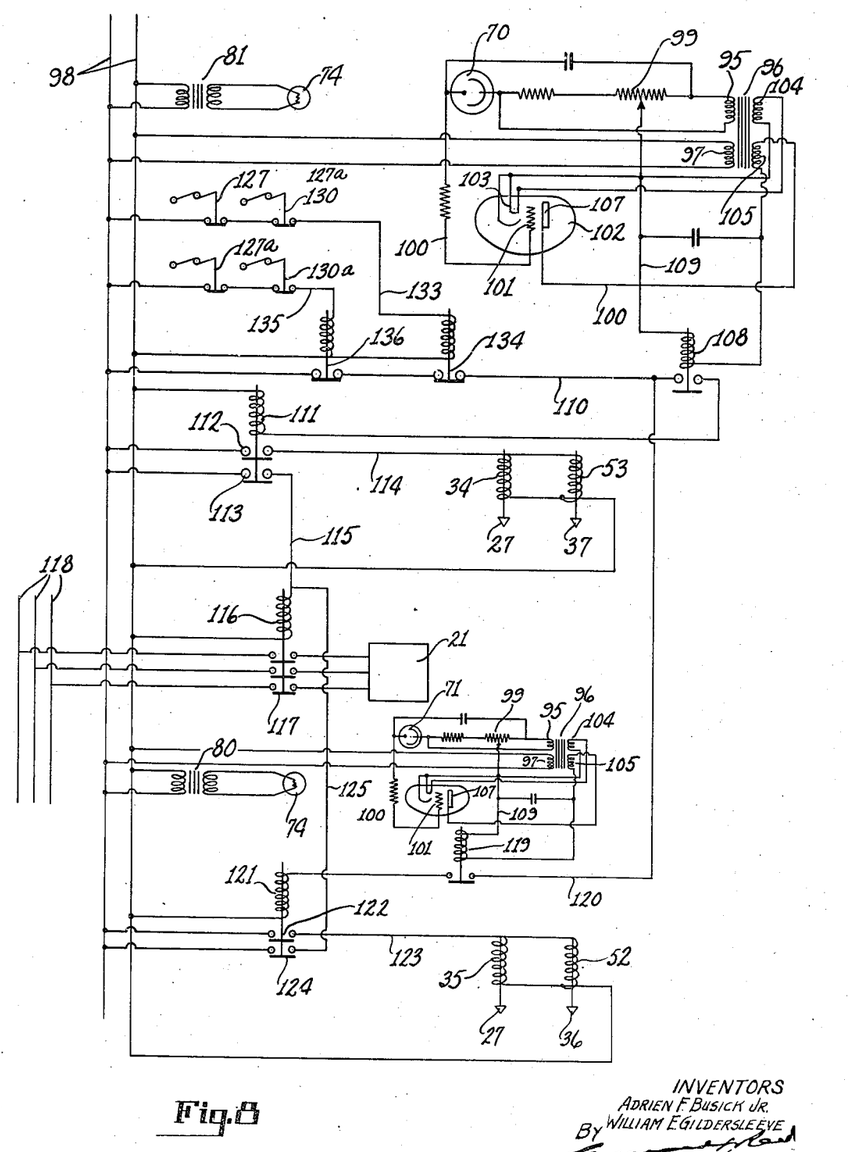
Fig. 8 is a circuit diagram.
Figure 9:
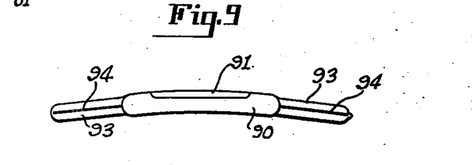
Fig. 9 is a detail view of a tilt responsive device.

As has been stated, the light controlled devices and their amplifying mechanisms are of well known construction and, as shown in the diagram of Fig. 8, the photoelectric cell 70 is connected in circuit with the secondary winding 95 of a transformer 96, the primary winding 97 of which is connected across a 110 volt supply line 98. A potentiometer is connected in circuit between the secondary and the cell. The other terminal of the cell is connected by a conductor 100 with the grid 101 of an amplifying tube 102. The filament 103 of the amplifying tube is connected with a second secondary 104 of the transformer 96. A third secondary, 105, of the transformer is connected by a conductor 106 with the plate 107 of the amplifying tube and with a relay 108, this relay being connected by a conductor 109 with the potentiometer 99. Thus when light is projected onto the photoelectric cell 70 the current flows from the transformer through the cell and through the amplifying tube where it is amplified sufficiently to operate the relay 108. The relay 108 serves to close the circuit 110 connected across the supply line 98 and including the winding of a relay 111, so that the latter winding will be energized when the relay 108 is energized to close the circuit 110. The relay 111 embodies two switches, 112 and 113. The switch 112 is in a circuit 114 connected across the supply line 98 and including the windings of the solenoid 34 for the two way valve 27 and the winding of the solenoid 53 for the valve 37, so that the energization of the relay 111 will open the valve 27 to connect the pressure pipe with the jack A and will open the valve 37 to connect the jack B with the return pipe. The switch 113 controls a circuit 115 connected across the supply line 98 and including a magnet winding 116 which operates a switch 117 to connect the pump motor 21 across a 440 volt three phase circuit 118. Thus it will be seen that when the light is projected on the photoelectric cell 70 the pump will be started and the valves selectively operated to cause liquid under pressure to be introduced into the jack A and to cause liquid to be withdrawn from the jack B. The sensitivity of the control mechanism may be varied by adjusting the potentiometer 99 to vary the amount of current necessary to actuate the relay 108, or by varying the normal spacing between the bubble of tilt responsive device and the two light beams.

The control unit of photoelectric cell 71 is identical with that above described and its relay 119 controls a circuit 120 connected across the supply line 98 and including the winding of a double relay 121 similar to relay 111. The switch element 122 of this relay will close the circuit 123 for the solenoid 35 of the two way valve 27 and for the solenoid 52 for the valve 36. The switch element 124 of the relay 121 is connected by a conductor 125 with the relay 116 which actuates the motor switch. Thus when light is projected onto the photoelectric cell 71 the pump is connected with the jack B and the jack A is connected with the return pipe and the operation of the pump is initiated simultaneously therewith.

Limit switches are provided to deenergize the valve actuating devices and the motor when any one of the jacks reaches the limit of its extension or contraction. As shown in Fig. 3, a rod or standard 126 is rigidly secured to the frame of the traction device 11 and supports at its upper end a switch 127 having an actuating member 128. Mounted on the frame 10, adjacent the lower end of the cylinder 13, is a trip arm 129 so arranged that when the cylinder 113 nears the upper limit of its movement the switch arm will engage the actuating arm 128 and open the switch 127. The trip arm 129 carries a switch 130 having an actuating member 131 so arranged that as the cylinder approaches the lower limit of its movement the actuating member 131 will engage a trip arm 132 secured to the frame of the traction device and thus open the switch 130. There are normally closed limit switches for each jack of each pair, and the limit switches for the jacks A and B are indicated in Fig. 8 as 127 and 130, 127a and 130a. The switches 127 and 130 are connected in series in a circuit 133 which includes the winding of a magnetically operated switch 134 in the circuit 110. Limit switches 127a and 130a are in series in a circuit 135 which includes the winding of a magnetically operated switch 136 in the circuit 110. Thus if any one of the four limit switches is open the circuit 110 will be broken and the relay 111 will be deenergized, thereby deenergizing the valve actuating devices and the motor.

The several switches may be arranged in any suitable positions with relation to the other parts of the apparatus but, in the present arrangement, they are enclosed in a cabinet or box 137 mounted on the base structure.

It is also desirable that there should be arranged on the excavator, in an accessible position, a switch device 138 whereby the control circuits may be interrupted or adjusted for hand operation or automatic operation. Further, it is desirable that there should be located in an accessible position manually operated switch means 139 whereby the jack may be raised or lowered.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent, is:

1. In an apparatus for automatically controlling the operation of means for restoring a normally horizontal structure to its horizontal position, a light controlled device to control the operation of said restoring means, a source of light arranged in a fixed position with relation to said light controlled device to project light onto said light controlled device, and means controlled by the tilting movement of said structure to control the projection of light from said light source onto said light controlled device.

2. In an apparatus for automatically controlling the operation of means for restoring a normally horizontal structure to its horizontal position, a photoelectric cell, a light source fixed with relation to said photoelectric cell for projecting light onto said photoelectric cell, means to be controlled by the tilting movement of said structure to control the projection of light onto said cell, and means controlled by said cell for controlling the operation of said restoring means.

3. In an apparatus for automatically controlling the operation of means for restoring a normally horizontal structure to its horizontal position, a light controlled device to control the operation of said restoring means, a source of light adapted to project light onto said light controlled device, and a device adapted to tilt with said structure and having means controlled by its tilting movement to initiate and interrupt the projection of light from said light source to said light controlled device.

4. In an apparatus for automatically controlling the operation of means for restoring a normally horizontal structure to its horizontal position, a light controlled device to control the operation of said restoring means, a source of light adapted to project light onto said light controlled device, a device having a part movable into and out of a position to prevent the passage of light from said light source to said light controlled device, and means for connecting the last mentioned device with said structure for movement in accordance with the tilting movement of said structure.

5. In an apparatus for automatically controlling the operation of means for restoring a normally horizontal structure to its horizontal position, a light controlled device to control the operation of said restoring means, a source of light adapted to project light onto said light controlled device, a sealed transparent tube tiltably supported between said light source and said light controlled device and containing liquid and a bubble, said tube being so arranged that when in one position said liquid will prevent the passage of light from said source to said light controlled device and when in another position light will pass from said source to said light controlled device through said bubble, and means for causing said tube to tilt in accordance with the tilting of said structure.

6. In an apparatus for automatically controlling the operation of means for restoring a normally horizontal structure to its horizontal position, a light controlled device to control the operation of said restoring means, a source of light adapted to project light onto said light controlled device, a sealed transparent tube tiltably supported between said light source and said light controlled device and containing liquid and a bubble, said tube being so arranged that when in one position said liquid will prevent the passage of light from said source to said light controlled device and when in another position light will pass from said source to said light controlled device through said bubble, and means for mounting said tube, said light source and said light controlled device on said structure for tilting movement thereby and in fixed relation one to the other.

7. In an apparatus for automatically controlling the operation of means for restoring a normally horizontal structure to its horizontal position, a sealed tube containing liquid and a bubble, means for connecting said tube with said structure for tilting movement thereby, and means controlled by the position of said bubble with relation to said tube to operate said restoring means.

8. In an apparatus for automatically controlling the operation of means for restoring a normally horizontal structure to its horizontal position, two light controlled devices, separate means for projecting a beam of light on each of said devices, means to control the projection of said light beams in accordance with the direction in which said structure tilts, and means controlled by the respective light controlled devices to operate said restoring means.

9. In an apparatus for automatically controlling the operation of means for restoring a normally horizontal structure to its horizontal position, two light controlled devices, light sources arranged to project separate beams of light on the respective light controlled devices, a movable device adapted to be connected with said structure for movement by the tilting movement of the latter and having means for interrupting both beams when said movable device is in its normal position and for causing one of said beams to be projected onto its light controlled device when said movable device is moved in one direction from its normal position and causing the other beam to be projected onto its light controlling device when said movable device is moved in the other direction from its normal position, and means controlled by said light controlled devices to operate said restoring means in accordance with the direction in which said structure is tilted.

10. In an apparatus for automatically controlling the operation of means for restoring a normally horizontal structure to its horizontal position, two light controlled devices, light sources arranged to project separate beams of light on the respective light controlled devices, a movable device adapted to be connected with said structure for movement by the tilting of the latter, said movable device being arranged to intercept both beams of light when it is in its normal position and to be moved to a non-intercepting position with relation to one of said beams of light when it is moved in either direction from said normal position by the tilting of said structure, and means controlled by said light controlled devices to operate said restoring means in accordance with the direction in which said structure is tilted.

11. In an apparatus for automatically controlling the operation of means for restoring a normally horizontal structure to its horizontal position, two light controlled devices, light sources arranged to project separate beams of light on the respective light controlled devices, a transparent tube tiltably supported between said light source and said light controlled devices in the path of said light beams and containing liquid and a bubble, said tube being so arranged that said bubble will be located between said light beams when said tube is in its normal position and will be moved into the path of one or the other of said light beams when said tube is tilted in either direction from said normal position, means for connecting said tube with said structure for movement by the tilting of the latter, and means controlled by said light controlled devices to operate said restoring means in accordance with the direction in which said structure is tilted.

12. In an apparatus for automatically controlling the operation of means for restoring a normally horizontal structure to its horizontal position, electrical means for selectively controlling the operation of said restoring means, a tiltable tube containing liquid and a bubble, means for connecting said tube with said structure for tilting movement thereby, and means controlled in accordance with the position of said bubble in said tube to control the energization of said electrical means.

13. In an apparatus for automatically controlling the operation of means for restoring a normally horizontal structure to its horizontal position, a base, light controlled devices, light sources and a level responsive device to control the projection of light from said light sources onto said light controlled devices, all mounted in relatively fixed positions on said base, vibration absorbing means for securing said base to said structure, and means controlled by said light controlled devices to operate said restoring means.

14. In an apparatus for automatically controlling the operation of means for restoring a normally horizontal structure to its horizontal position, a base, means for connecting said base with said structure for tilting movement therewith, a sub-base mounted on said base for adjustment with relation thereto to a level position, light controlled devices, light sources, and a level responsive device all mounted on said sub-base in normally fixed relation one to the other, and means controlled by said light controlled devices to operate said restoring means.

15. In an apparatus for automatically controlling the operation of means for restoring a normally horizontal structure to its horizontal position, a light controlled device, a relay, a circuit for said relay controlled by said light controlled device, a potentiometer in said circuit to vary the amount of current required to operate said relay, a source of light, means controlled by the tilting of said structure to control the projection of light from said source to said light controlled device, and means controlled by said relay to operate said restoring means.

16. In an apparatus of the character described, a structure to be supported, traction devices, hydraulic jacks to support the respective corners of said structure on said traction devices, a liquid reservoir, a pump having its intake connected with said reservoir, a pressure pipe connected with the outlet of said pump, a return pipe connected with said reservoir, pipes connected respectively with two diagonally opposite jacks, valve means for connecting said pressure pipe with either of the last mentioned pipes and for connecting the other of said last mentioned pipes with said return pipe, a tilt responsive device carried by said structure and movable by the tilting movement of the latter about an axis intersecting the diagonal line connecting said jacks, and means controlled by said tilt responsive device for actuating said valve means in accordance with the direction in which said structure tilts.

17. In an apparatus of the character described, a structure to be supported, traction devices, hydraulic jacks to support the respective corners of said structure on said traction devices, a liquid reservoir, a pump having its intake connected with said reservoir, a pressure pipe connected with the outlet of said pump, a return pipe connected with said reservoir, pipes connected respectively with two diagonally opposite jacks, a normally closed two way valve for connecting said pressure pipe with either of the last mentioned pipes, normally closed valves for connecting either of said last mentioned pipes with said return pipe, electrical means for actuating the respective valves, means for selectively energizing said actuating means, and a tilt responsive device for controlling said energizing means in accordance with the tilting movement of said structure about an axis intersecting the diagonal line connecting said jacks.

18. In an apparatus of the character described, a structure to be supported, traction devices, hydraulic jacks to support the respective corners of said structure on said traction devices, a liquid reservoir, a pump having its intake connected with said reservoir, a pressure pipe connected with the outlet of said pump, a return pipe connected with said reservoir, pipes connected respectively with two of said jacks, electrically actuated valve means for connecting said pressure pipe with either of the last mentioned pipes and for connecting the other of said last mentioned pipes with said return pipe, light controlled devices selectively controlling the operation of said valve means, means for projecting light onto said light controlled devices, and a tilt responsive device to control the projection of said light in accordance with the tilting movement of said structure.

19. In an apparatus of the character described, a structure to be supported, traction devices, hydraulic jacks to support the respective corners of said structure on said traction devices, a liquid reservoir, a pump having its intake connected with said reservoir, a pressure pipe connected with the outlet of said pump, a return pipe connected with said reservoir, pipes connected respectively with two of said jacks, valve means for connecting said pressure pipe with either of the last mentioned pipes and for connecting the other of said last mentioned pipes with said return pipe, light controlled devices, means for projecting light onto said light controlled devices, a tilt responsive device to control the projection of light onto said light responsive devices in accordance with the tilting movement of said structure, means controlled by said light controlled devices to initiate the operation of said pump, and means controlled by the respective light controlled devices to actuate said valves to connect a selected jack with said pressure pipe and to connect the other jack with said return pipe.

20. In a level controlling apparatus, a structure to be controlled, traction devices at the respective corners of said structure, hydraulic jacks interposed between said corners and the respective jacks, a liquid reservoir, a separate pipe system connected with the jacks of each pair of diagonally opposite jacks and with said reservoir, a separate pump connected with each pipe system and with said reservoir, electric motors for operating said pumps, each pipe system including valves operable to connect either jack of that pair of jacks with said pump and to connect the other jack of that pair with said reservoir, electrical means for actuating said valves, two light controlled devices associated with each pair of jacks, means controlled by said light controlled devices for energizing the motor of the corresponding pump, means controlled by the respective light controlled devices for selectively energizing the actuating means for said valves, means for projecting light onto the respective light controlled devices, and tilt responsive devices associated with the light controlled devices for the respective pairs of jacks and operable by different tilting movements of said structure, each tilt responsive device being arranged to normally prevent light from being projected on either of the light controlled devices with which it is associated and to cause light to be projected onto one or the other of said light controlled devices when said structure is tilted in either of two directions.

21. In an apparatus of the character described, a structure to be supported, traction devices, hydraulic jacks to support the respective corners of said structure on said traction devices, a liquid reservoir, a pump having its intake connected with said reservoir, a pressure pipe connected with the outlet of said pump, a return pipe connected with said reservoir, pipes connected respectively with two diagonally opposite jacks, valve means for connecting said pressure pipe with either of the last mentioned pipes and for connecting the other of said last mentioned pipes with said return pipe, a metering valve interposed between said valve means and said return pipe to regulate the flow of liquid to said reservoir, a tilt responsive device carried by said structure and movable by the tilting movement of the latter about an axis intersecting the diagonal line connecting said jacks, and means controlled by said tilt responsive device for actuating said valve means in accordance with the direction in which said structure tilts.

22. In an apparatus of the character described, a structure to be supported, a traction device at each corner of said structure, hydraulic jacks to support the respective corners of said structure on said traction devices, two independently operating level restoring mechanisms each associated with a different pair of diagonally opposite jacks and each including a liquid reservoir, a pump having its intake connected with said reservoir, a pressure pipe connected with the outlet of said pump, a return pipe connected with said reservoir, pipes connected respectively with the two jacks of the corresponding pair of jacks, valve means for connecting said pressure pipe with either of the last mentioned pipes and for connecting the other of said last mentioned pipes with said return pipe, a tilt responsive device carried by said structure and movable by the tilting movement of the latter about an axis intersecting the diagonal line connecting the jacks of said pair, and means controlled by said tilt responsive device for actuating said valve means in accordance with the direction in which said structure tilts about said axis.

23. In an apparatus of the character described, a structure to be supported, a traction device at each corner of said structure, hydraulic jacks to support the respective corners of said structure on said traction devices, two independently operating level restoring mechanisms each associated with a different pair of diagonally opposite jacks and each including a reservoir, a pump having its intake connected with said reservoir, a pressure pipe connected with the outlet of said pump, a return pipe connected with said reservoir, pipes connected respectively with the two jacks of the corresponding pair of jacks, a normally closed two-way valve for connecting said pressure pipe with either of the last mentioned pipes, normally closed valves for connecting either of said last mentioned pipes with said return pipe, a metering valve interposed between the respective last mentioned valves and said return pipe to regulate the flow of liquid to said reservoir, electrical means for actuating the respective normally closed valves, means for selectively energizing said actuating means, and means for controlling said energizing means in accordance with the tilting movement of said structure about an axis intersecting a diagonal line connecting the jacks of said pair and including a tilt responsive device carried by said structure and movable by the tilting movement of the latter about said axis.

ADRIEN F. BUSICK, Jr.
WILLIAM E. GILDERSLEEVE.